United States Patent Office 3,331,695
Patented July 18, 1967

3,331,695
SPODUMENE ACCELERATED PORTLAND CEMENT
Richard L. Angstadt, Silver Spring, and Forrest R. Hurley, Ellicott City, Md., assignors to W. R. Grace & Co., New York, N.Y., a corporation of Connecticut
No Drawing. Filed June 23, 1964, Ser. No. 377,378
6 Claims. (Cl. 106—89)

This application relates to a cement composition having an accelerated hardening rate and to the method for making this composition.

In summary, the process of this invention is a method for producing a cement mixture having an accelerated hardening rate comprising adding to an alite cement from about 0.1 to 10% spodumene based on the dry weight of the cement binder, and intimately mixing the ingredients to provide a uniform distribution of the spodumene throughout the cement.

In summary, the process of this invention is a method for accelerating the rate of hardening of an alite cement comprising mixing water, an alite cement, and from 0.1 to 10% of spodumene based on the dry weight of the cement binder, and allowing the mixture to harden.

In summary, the composition of this invention is an alite cement containing from about 0.1 to 20% spodumene based on the dry weight of the cement binder.

In many of the uses of alite cement, of which Portland cement, and mortars and concretes containing Portland cement are the most common examples, it is desirable to accelerate the rate of hardening thereof. As the rate of hardening is accelerated, heat evolution is also accelerated, and the additional heat is useful in winter for keeping the water in the cement from freezing. Furthermore, in many uses it is desirable that the concrete hardening be sufficiently slowed to enable the concrete to be poured in place, but after the concrete is placed, rapid hardening is desired. In the production of molded objects of concrete, accelerated hardening allows the use of fewer mold and lowers the necessary capital investment. In the process for cementing oil wells, the cement must remain sufficiently fluid to be deposited in the well, but it is desirable to accelerate the deposited cement rapidly thereafter.

A wide variety of inorganic compounds have been found to be active accelerators of alite cement hardening. The most commonly employed accelerator is calcium chloride. However, calcium chloride has a serious deficiency. The calcium chloride in the cement promotes corrosion of iron reinforcing rods and mesh often used in concrete construction, since calcium chloride is itself extremely corrosive.

It is one object of this invention to provide a method for accelerating the hardening rate of alite cements with a non-corrosive accelerator.

It is another object of this invention to provide alite cements having an accelerated rate of hardening but which does not contain a corrosive accelerator.

The binder in the cements, mortars, and concretes used widely as a construction material is Portland cement. Portland cement is manufactured by calcining a mixture of lime stone and clay to form a clinker, and by grinding the clinker to a fine powder. The major compounds found in Portland cement are tricalcium silicate, dicalcium silicate, tricalcium aluminate, and tetracalcium aluminoferrite. The tricalcium and dicalcium silicates are thought to be the principal bonding constituents in the Portland cement. Tricalcium silicate when mixed with water forms a calcium silicate hydrate known as tobermorite gel and calcium hydroxide. The dicalcium silicate when contacted with water forms a similar product but at a much lower rate of reaction. The tricalcium silicate, having the greater rate of reaction determines, to a large extent, the hardening rate of the cement. To provide materials which are suitable for different uses, Portland cements having a range of hardening rates have been found desirable. By producing cements having a range of proportions of tricalcium silicate present, a range of hardening rates has been obtained. Four general types of Portland cements varying principally in the relative quantities of tricalcium silicate and dicalcium silicate present therein, are commonly produced. The proportions of the principal compounds present in each type of cement are shown in Table I.

TABLE I

| Cement Type | I | II | III | IV |
|---|---|---|---|---|
| Composition, weight percent: | | | | |
| Tricalcium silicate | 53 | 47 | 58 | 26 |
| Dicalcium silicate | 24 | 32 | 16 | 54 |
| Tricalcium aluminate | 8 | 3 | 8 | 2 |
| Tetracalcium aluminoferrite | 8 | 12 | 8 | 12 |

The term "alite cement" is defined as including neat pastes, mortars, and concretes and the mixed, dry, unreacted ingredients of neat pastes, mortars, and concretes, comprising an alite cement binder, a composition containing greater than 20 percent tricalcium silicate based on the dry weight of the composition. The most common alite cements are Portland cements, and mortars and concretes containing Portland cements. Most commercial available alite cements contain binders comprising from about 20 to 75 percent tricalcium silicate. The alite cement binder or cement binder is the component which provides the desired bonding, for example, Portland cement.

A wide range of the hardening rates can be obtained by producing cement having varying quantities of tricalcium silicate such as are shown in Table I. However, the particular proportion of the cement ingredients and the rate of hardening obtained is limited by the type of raw materials from which the cement is produced. As a result, for some uses even the Type III cement does not harden at a desired accelerated rate. Furthermore, in some uses such as in oil well treatment, a vary low rate of initial hardening is desired such as is provided by the Type IV cement so that the cement can be mixed and placed, before it loses its fluidity. However, once in place, it is desirable to provide a rapid rate of hardening.

Accelerators are employed to meet these requirements. Accelerators are compositions which have been found to increase the initial rate of hardening of a cement. The most widely used cement, mortar and concrete accelerator is calcium chloride. This compound creates serious difficulties when iron reinforcing rods and mesh are employed in concrete construction. Calcium chloride is extremely corrosive.

Spodumene, $LiAlSi_2O_6$ has been found to be a superior alite cement hardening accelerator. Previously known cement hardening accelerators were water soluble, and water solubility was thought to be a requisite characteristic of an accelerator. Unexpectedly, spodumene is an excellent accelerator even though it has a low solubility in water. Not only does the spodumene provide a rapid alite cement hardening rate, but the spodumene is a non-corrosive accelerator. When the alite cement is used in the presence of iron or other metal reinforcing materials, spodumene can be used without creating corrosion problems. Acceleration of alite cements can be obtained with from about 0.1 to 20 percent spodumene in the cement. Preferably, from about 1.0 to about 15 percent spodumene is employed. The optimum range is from about 0.5 to 5 percent spodumene. These concentrations are expressed as percent of the dry weight of the cement binder.

The spodumene can be added to the alite cement by various techniques. Preferably, the spodumene is added to the alite cement binder clinker prior to grinding, and the components can be ground concurrently and be thoroughly mixed during the grinding step. The spodumene can also be added to the alite cement as a preground dry powder or water slurry of such a powder, and the ingredients can be thoroughly mixed to uniformly disperse the active ingredients.

Our invention is further illustrated by the following specific, but non-limiting examples.

*Example 1*

In this example, alpha-spodumene, a naturally occurring lithium ore having the chemical formula $LiAlSi_2O_6$ was interground with a Type III Portland cement. A 1000 gm. sample of the cement was blended for 6 hours in a laboratory ball mill with 20 gm. of alpha-spodumene. A settable cement was prepared from the mixture using a water to cement ratio of 0.65 to 1. Two inch mortar cubes were prepared according to ASTM test C109–58, and their compressive strengths were measured after 12 hours. Nine cubes were tested. The results are shown in Table II.

TABLE II

| Concentration of spodumene, wt. percent: | Compressive strength, p.s.i. |
|---|---|
| 0 | 181±116 |
| 2.0 | 638± 91 |

*Example 2*

In this example, beta-spodumene was employed as the accelerator.

Alpha-spodumene undergoes irreversible phase transition to beta-spodumene at temperatures in excess of 900° C. Beta-spodumene was prepared for this test by heating alpha-spodumene at 980° C. for 4 hours. A 1000 gm. sample of Type III Portland cement employed in Example 1 was interground with 20 gm. of beta-spodumene. Cubes were prepared from the mixture and were tested by the method described in Example 1. The results are shown in Table III.

TABLE III

| Concentration of spodumene, wt. percent: | Compressive strength, p.s.i. |
|---|---|
| 0 | 181±116 |
| 2.0 | 741±119 |

*Example 3*

In this example, the acceleration of Type I Portland cement hardening with both alpha and beta-spodumene was tested. A 20 gm. sample of the accelerator in each run was interground with 1000 gm. Portland cement. The water to cement ratio in each run was 0.65. The 24 hour compressive strength of cubes made from each sample was tested by the procedure described in Example 1. The results are shown in Table IV.

TABLE IV

| | Concentration, wt. percent | Compressive Strength, psi. |
|---|---|---|
| Accelerator Type: | 0 | 553±46 |
| Alpha-spodumene | 2.0 | 626±40 |
| Beta-spodumene | 2.0 | 683±38 |

Obviously, many modifications and variations of the invention as hereinabove set forth may be made without departing from the essence and scope thereof, and only such limitations should be applied, as are indicated in the appended claims.

We claim:
1. A process for producing a cement mixture having an accelerated hardening rate comprising,
   (a) adding to Portland cement from about 0.1 to 20% spodumene based on the dry weight of the cement, and
   (b) thoroughly mixing the components of the mixture.
2. A process for producing a cement mixture having an accelerated hardening rate comprising,
   (a) mixing spodumene from about 0.1 to 20% spodumene with Portland cement clinker, and
   (b) grinding the mixture to form a fine particle size, homogeneous cement.
3. A process for producing a cement mixture having an accelerated hardening rate comprising,
   (a) adding water and spodumene to Portland cement, the amount of spodumene added being from about 0.1 to 20% of the dry weight of the cement, and
   (b) thoroughly mixing the components of the mixture.
4. A process for accelerating the hardening rate of Portland cement mixtures comprising,
   (a) adding to Portland cement from about 0.1 to 20% spodumene based on the dry weight of the cement,
   (b) mixing the components to form a homogeneous mixture, and
   (c) adding the water to the mixture.
5. A process for accelerating the hardening rate of Portland cement mixtures comprising,
   (a) mixing from about 0.1 to 20% spodumene with a Portland cement clinker,
   (b) grinding the mixture of spodumene and clinker to form a fine particle size, homogeneous cement, and
   (c) adding water to the mixture.
6. A cement composition consisting essentially of Portland cement and from about 0.1 to 20% spodumene based on the dry weight of the cement.

References Cited
UNITED STATES PATENTS
2,806,530  9/1957  Binkley _____ 106—89
2,815,293  12/1957  Randall et al. _____ 106—97

TOBIAS E. LEVOW, *Primary Examiner.*

S. E. MOTT, *Assistant Examiner.*